United States Patent
Tamura

(10) Patent No.: US 8,123,995 B2
(45) Date of Patent: Feb. 28, 2012

(54) METHOD OF MANUFACTURING PRODUCT HAVING INJECTION MOLDED PORTION

(75) Inventor: Tatsuya Tamura, Hayama (JP)

(73) Assignee: Tokai Kogyo Company Limited, Obu (JP)

( * ) Notice: Subject to any disclaimer, the term of this patent is extended or adjusted under 35 U.S.C. 154(b) by 280 days.

(21) Appl. No.: 12/385,300

(22) Filed: Apr. 3, 2009

(65) Prior Publication Data

US 2009/0252969 A1    Oct. 8, 2009

(30) Foreign Application Priority Data

Apr. 7, 2008 (JP) ................. 2008-099250

(51) Int. Cl.
*B29C 45/14* (2006.01)
*B29C 45/26* (2006.01)
(52) U.S. Cl. .................. 264/255; 264/328.12
(58) Field of Classification Search .......... 264/255, 264/328.8, 328.12
See application file for complete search history.

(56) References Cited

U.S. PATENT DOCUMENTS 2,191,703 A  *  2/1940  Anderson ............ 264/279

(Continued)

FOREIGN PATENT DOCUMENTS

| JP | A-59-078832 | 5/1984 |
| JP | A-61-148012 | 7/1986 |
| JP | 01-258287 | * 10/1989 |

(Continued)

OTHER PUBLICATIONS

Nov. 10, 2011 Office Action issued in Japanese Application No. 2008-099250 (with translation).

*Primary Examiner* — Jill Heitbrink
(74) *Attorney, Agent, or Firm* — Oliff & Berridge, PLC

(57) ABSTRACT

A molded product includes an already-formed member and an injection molded portion. The already-formed member, which has a joining surface, is placed in an injection molding mold, and the joining surface and the injection molding mold define a molding cavity. The injection molding mold further defines a spill cavity that is in communication with the molding cavity. Liquid molding material is injected into the molding cavity. At least some of initial molding material which has initially reached the joining surface flows into the spill cavity due to injection pressure of subsequent molding material injected after injection of the initial molding material, and is replaced with the subsequent molding material, which has a temperature higher than that of the initial molding material and a viscosity lower than that of the initial molding material. When the liquid molding material hardens to form an injection molded portion joined to the joining surface of the first already-formed member, the first already-formed member and the injection molded portion are a joined molded product.

12 Claims, 8 Drawing Sheets

U.S. PATENT DOCUMENTS

| | | | | |
|---|---|---|---|---|
| 3,357,056 | A * | 12/1967 | Reyburn | 425/358 |
| 5,505,602 | A * | 4/1996 | Sumi | 425/116 |
| 6,620,365 | B1 * | 9/2003 | Odoi et al. | 264/261 |
| 6,936,320 | B2 * | 8/2005 | Kubo et al. | 428/36.9 |

FOREIGN PATENT DOCUMENTS

| | | |
|---|---|---|
| JP | B-03-016253 | 3/1991 |
| JP | A 2002-12038 | 1/2002 |
| JP | A-2004-250154 | 9/2004 |

* cited by examiner

METHOD OF MANUFACTURING PRODUCT HAVING INJECTION MOLDED PORTION

BACKGROUND

This invention relates to a product having an injection molded portion at a part thereof, and a method of manufacturing that product. Furthermore, this invention relates to an injection molding mold used in the manufacturing method, and a manufacturing apparatus provided with the molding mold.

As external vehicle parts, elongate molded products are used, which have various cross-sectional shapes. These parts are called roof moldings, weather strips, glass run channels, etc. As an example of this type of elongate molded product, there is a product having a molded member in which a thermoplastic polymer molding material such as a thermoplastic resin material or a thermoplastic elastomer material is molded in an elongate shape by, for example, extrusion molding, and an injection molded portion is molded and joined to a longitudinal part of the molded member by injection molding. As a method of manufacturing this type of molded product that has an injection molded portion at a part thereof, a method, for example, shown in Japanese Published Patent Application 2002-12038 (JP-A-2002-12038) is known.

SUMMARY

However, according to the method of manufacturing described in JP-A-2002-12038, there is a possibility that the joint strength at a boundary surface of a molded member ("extrusion molded portion" in JP-A-2002-12038) and an injection molded portion ("molded portion" in JP-A-2002-12038) may not be sufficient. That is, a polymer molding material for an injection molded portion which is injected into an injection molding mold cavity in a melted state is cooled while it reaches a surface (that is, a joining surface) of an already-formed member (hereafter called "first formed member") that has been separately molded, and to which connection is to be made. Accordingly, viscosity of the polymer molding material increases, and the injection pressure decreases. As a result, a molding material holding sufficient heat and pressure to join to a surface (surface exposed to the inside of the cavity) of the first formed member to which connection is to be made with an injection molded portion formed of the polymer molding material cannot reach the surface of the first formed member. Thus, a joining surface of the injection molded portion and the first formed member can easily be peeled away.

In particular, when a predetermined injection molded portion is to be joined to a first molded member having a portion (for example, a protruded lip) in which thickness becomes relatively thin in a cross-sectional shape, in an injection molding mold in which a molding cavity is formed inside including a space corresponding to the thin shape of the first molded member, a polymer molding material holding sufficient heat and pressure has difficulty reaching an end portion of the thin space, and joining at the thin portion becomes more difficult. Furthermore, even if they are joined, there is a possibility that a plurality of small cracks (that is, microscopic non-connected portions) which are not visible to the naked eye may be generated. If these cracks gradually enlarge, the boundary portion (joining surface) is eventually peeled away. Furthermore, when these cracks are generated in a visible portion, ornamentality (for example, aesthetics) may be significantly lost.

Therefore, various embodiments of this invention reflect on the above-mentioned conventional problems related to manufacturing a molded product in which an injection molded portion is joined to part of an already-formed member. An object of various embodiments of this invention is to provide a molded product manufactured by a method of manufacturing a molded product, and a method of manufacturing which can fill a molding material for injection molded portion formation, holding sufficient heat and pressure, to an exposed joining surface of an already-formed member within a molding cavity and can sufficiently join the joining surface of the already-formed member with an injection molded portion formed of the polymer molding material. Furthermore, another object of various embodiments is to provide an injection molding mold which allows such joining, and a manufacturing apparatus having such a molding mold.

To address any or all of the problems, various embodiments provide a method of manufacturing a molded product, of which a part is an injection molded portion. Here, "a molded product, of which a part is an injection molded portion" refers to a molded product in which a member already formed by extrusion molding, etc. is joined to an injection molded portion.

This inventor observed the above-mentioned crack generation phenomenon in detail and considered the cause(s). It was discovered that in a thin protruding portion such as the lip portion within the molding cavity, joint strength cannot be obtained because at least one of temperature or pressure needed for a melted polymer molding material to be joined, which is supplied to the thin protruding portion, is lacking when the injection molded portion is molded.

Some embodiments provide a method of manufacturing a molded product, comprising: placing a first already-formed member, which has an exposed joining surface, in an injection molding mold, the injection molding mold and the exposed joining surface defining a molding cavity when the injection molding mold is closed, the injection molding mold further defining, when closed, a spill cavity that protrudes in a direction that (i) extends from the exposed joining surface of the first already-formed member and (ii) is a direction of separation from the molding cavity, the spill cavity being in communication with the molding cavity; injecting liquid molding material into the molding cavity, at least some of initial molding material which has initially reached the exposed joining surface flowing into the spill cavity due to injection pressure of subsequent molding material injected after injection of the initial molding material, and being replaced with the subsequent molding material, which has a temperature higher than that of the initial molding material and a viscosity lower than that of the initial molding material; holding the subsequent molding material pressed against the joining surface of the first already-formed member for a predetermined time, causing pressure and/or heat of the subsequent molding material to act on the joining surface of the already-formed member; and allowing the liquid molding material to harden to form an injection molded portion joined to the joining surface of the first already-formed member, the first already-formed member and the injection molded portion together being a joined molded product. A further step may be provided for separating and removing the molding material that flowed into the spill cavity from the joined molded product.

According to such a method, the spill cavity is formed in the direction along the boundary surface at which the exposed joining surface of the first already-formed member and the injection molded portion are joined inside of the injection molding mold, and which is the direction of separation from the molding cavity. The spill cavity is connected to the molding cavity. Thus, the initial molding material can flow and spill into the inside of the spill cavity due to injection pressure of the subsequent molding material (that is, a succeeding molding material which is injected after the initial molding material from an injection gate), in which temperature is higher than that of the initial molding material and viscosity is lower than that of the initial molding material. Furthermore, the portion of the initial molding material which has been spilled is replaced with the subsequent molding material. Therefore, subsequent molding material having an amount of heat (temperature) and pressure necessary for connection can act on the exposed joining surface of the first already-formed member, and the injection molded portion and the exposed joining surface can be reliably joined with a strength stronger than that achieved conventionally.

Furthermore, the initial molding material which is first injected into the molding cavity may contain foreign objects such as minute dust, oil, and mold release agent which are attached to the inside of the molding cavity when the initial molding material flows within the injection molding mold, but one of the reasons why joint strength deteriorates is the existence of foreign objects. According to the method described above, the initial molding material with such foreign objects is spilled to the inside of the spill cavity due to injection pressure of the subsequent molding material, and the spilled portion is replaced with the subsequent molding material. Thus, there is an effect that the initial molding material, which causes cracks and deterioration of joint strength, can be removed. In the same manner, dust, oil, etc. attached to the joining surface of the first already-formed member can be also ejected into the spill cavity.

The spill cavity may be connected to the molding cavity through a narrow flow path. Shear heat is generated as the initial molding material flows through the narrow flow path.

Thus, due to the generation of shear heat, temperature deterioration of the initial molding material which flows through the narrow flow path is suppressed. Also, temperature of the narrow flow path increases due to heat conduction, and viscosity increase is suppressed. Therefore an effect can be obtained in which the initial molding material is easily spilled to the spill cavity through the narrow flow path, and the subsequent molding material, which holds sufficient heat and pressure at the joining surface of the first already-formed member, can be injected into the molding cavity.

As a molding material of the injection molded portion, a polymer molding material which can be thermally welded to the first already-formed member is used, and the joining surface of the first already-formed member and the injection molded portion are joined by thermal welding.

With such a polymer molding material, an effect is obtained, in which the joining surface of the first already-formed member and the injection molded portion formed of the polymer molding material can manufacture a molded product strongly joined by thermal welding.

The first already-formed member may be formed of at least one substance selected from a group consisting of rubber and a thermoplastic resin. Some examples of thermoplastic resins are olefin system synthetic resins, olefin system thermoplastic elastomers, and styrene system thermoplastic elastomers. As a molding material of the injection molded portion, a thermoplastic synthetic resin, such as an olefin system synthetic resin, an olefin system thermoplastic elastomer or a styrene system thermoplastic elastomer, may be used.

With this structure, a molding material which is easily available on the market can be used, and suitable joining can be obtained by welding.

On the joining surface of the first already-formed member, a thermally activated adhesive layer may be applied in advance.

With this structure, a molded product can be manufactured in which the joining surface of the first already-formed member and the injection molded portion are more strongly joined by applying a thermally activated adhesive. Furthermore, even when a material with which a molding material of the first already-formed member has no compatibility or poor compatibility is used as a molding material of an injection molded portion, an effect is obtained in which reliable joining can be obtained.

A second already-formed member different from the first already-formed member may be positioned at a predetermined position within the injection molding mold, separated from the first already-formed member, and when the injection molding mold is closed, at least part of the second already-formed member is exposed to the molding cavity, and the joining surface of the second already-formed member is made part of the molding surface of the molding cavity; and the injection molded portion is molded between the respective joining surfaces of the first and second already-formed members, and the first and second already-formed members are connected through the injection molded portion by connecting both members with the injection molded portion.

With this structure, the respective joining surfaces of the first already-formed member and the second already-formed member are joined with the injection molded portion and are connected through the injection molded portion; thus, various shapes of the molded product can be manufactured.

A shape of the joining surface of the first already-formed member may be different from a shape of the joining surface of the second already-formed member.

With this structure, a molded product (for example, a glass run channel for a vehicle) in which the first and second already-formed members having joining surfaces of shapes different from each other are joined by an injection molded portion can be manufactured.

The first and second already-formed members may both be elongate members, with the joining surfaces formed on longitudinal direction ends of the elongate members.

With this structure, a molded product can be easily manufactured by joining the respective longitudinal direction ends of two elongate materials with an injection molded portion, and connecting the two elongate materials through the injection molded portion.

The first and second already-formed members may be positioned so that the joining surfaces are separate from each other and lie in crossing planes, and a substantially L-shaped injection molded portion may be molded, such that the first and second already-formed members are connected in a substantially L shape through the injection molded portion.

With this structure, a molded product (for example, a glass run channel for a vehicle) can be manufactured in which the first and second already-formed members are connected in a substantially L shape through an injection molded portion.

The first already-formed member may be elongate, and a part of the elongate first already-formed member may be notched for a predetermined length along a longitudinal direction, such that the part of the first already-formed member is divided into two, and two joining surfaces opposite to each other are formed at a predetermined interval along the longitudinal direction, the injection molded portion being molded between the two joining surfaces, and the joining surfaces of the first already-formed member being connected through the injection molded portion.

With this structure, an injection molded portion of predetermined shape can be molded in a portion in which part of the first already-formed member is removed and divided into two portions. That is, an effect is obtained in which an elongate molded product (for example, a door opening trim for a vehicle, which has a corner portion which is bent in an L shape) can be manufactured, which molds a predetermined shape of injection molded portion at an arbitrary location in a longitudinal direction.

An extrusion molded material formed of a polymer material may be used as the first already-formed member.

With this structure, an effect is obtained in which a molded product which uses a member in which a constant cross-section is molded in a predetermined shape by extrusion molding as a first already-formed member can be easily manufactured.

Furthermore, in order to realize one or more of the above-mentioned objects, according to a method of manufacturing a molded product having an injection molded portion disclosed as part of this disclosure, an injection molding mold which can be suitably used is provided. The injection molding mold comprises: a first mold and a second mold that can be closed and held together and opened and separated from each other; the first and second mold, when closed and held together, holding a first already-formed member, which has an exposed joining surface, such that the first and second mold and the exposed joining surface define a molding cavity; and a spill cavity defined by the first and second mold. The spill cavity protrudes in a direction that (i) extends from the exposed joining surface of the first already-formed member and (ii) is a direction of separation from the molding cavity. The spill cavity is in communication with the molding cavity. The injection molding mold further comprises an injection gate through which the heated and melted liquid molding material is injected into the molding cavity. At least some of initial molding material which has initially reached the joining surface when the molding material is injected from the injection gate flows into the spill cavity due to injection pressure of subsequent molding material injected after injection of the initial molding material, and is replaced with the subsequent molding material that has a temperature higher than that of the initial molding material and a viscosity lower than that of the initial molding material.

With such a structure, the manufacturing method described above can be suitably implemented, and an effect is obtained in which the injection molded portion can be reliably joined to the joining surface of the first already-formed member.

Furthermore, when an initial molding material moves within the molding cavity of the injection molding mold, even when foreign objects such as minute dust, oil, mold releasing agent, etc., that attach to the inside of the molding cavity are taken in, the initial molding material is spilled to the inside of the spill cavity by injection pressure of the subsequent molding material. Therefore, an effect is obtained in which an initial molding material which causes deterioration of joint strength can be eliminated.

Further, a stopper may be arranged, which contacts a joining surface of the first already-formed member and holds the first already-formed member in an accurate position.

With such a structure, the first already-formed member can be accurately positioned at a predetermined position by contacting the joining surface of the first already-formed member against a stopper, and the joining surface of the first already-formed member and the injection molded portion can be reliably joined at an accurate position.

The spill cavity may be arranged so as to be in communication with a cavity portion corresponding to a part of an injection molded portion molded by the molding cavity to be thinner than other portions.

With such a structure, an effect is obtained in which, at the joint portion of the first already-formed member and the injection molded portion, in the portion in which a thin portion in which cracks can be easily made is formed as well, the subsequent molding material, in which temperature is reliably high and viscosity is low, replaces the initial molding material.

The spill cavity may be defined in part by a concavity in at least one of the first or second mold, and has a tapered shape, widening toward a parting surface of the one of the first or second mold.

With such a structure, an effect is obtained in which the molding material pushed into and solidified in the spill cavity is formed in a tapered shape (or an amphitheater shape), so it can be easily removed from the mold.

The spill cavity may be connected to the molding cavity through a narrow flow path whose volume is relatively small compared to that of the molding cavity and that of the spill cavity.

With such a structure, when the molding material goes through the narrow flow path of a volume relatively smaller than that of the molding cavity and the spill cavity, shear heat is generated, so the temperature of the molding material does not decrease in the narrow flow path, and viscosity increase can be suppressed.

A cross-sectional area of the narrow flow path in a direction perpendicular to a flow direction of the molding material may be smaller than a cross-sectional area of the spill cavity in a direction perpendicular to the flow direction. For example, a ratio of the cross-sectional area of the narrow flow path to the cross-sectional area of the spill cavity may be in a range of from about 1:2 to about 1:20.

With this structure, an effect is obtained in which by making the cross section perpendicular to the moving direction of the narrow flow path smaller than the cross section of the spill cavity, after injection molding of the molded product and removing the molded product from the injection molding mold, the molding material solidified within the spill cavity by separated and removed from the molded product by cutting, etc., so separation can be easily performed, and a significant cut mark does not remain in the molded product.

The molding cavity may be defined primarily by a concavity in one of the first and second molds, and the narrow flow path may be defined primarily by a concavity in the other of the first and second molds.

With this structure, an effect is obtained in which after molding of the molded product, the portion connected to the injection molded portion and the molding material that flowed and solidified to the narrow flow path is formed at a portion which does not overlap the outer surface of the injection molded portion, so a cut mark which can be easily recognized is not generated in the molded product even if the solidified molding material is separated from the injection molded portion.

Furthermore, in order to realize the above-mentioned object, in the method of manufacturing the molded product having the injection molded portion as a part thereof, a manufacturing apparatus is provided which can be suitably used. The manufacturing apparatus comprises an injection molding mold as described above, and a molding material supply device, which supplies a heated and melted liquid molding material to the injection gate arranged at the injection molding mold in order to inject the heated and melted liquid molding material into the cavity.

With this structure, the manufacturing method or apparatus as described above can be suitably implemented.

Additionally, in a molded product manufactured by a manufacturing method or apparatus as described above, the injection molded portion obtained by injection molding is integrally joined to part of the separately molded first already-formed member.

A molded product with such a structure is a molded product without any cracks, or with very few cracks, in which the injection molded portion obtained by injection molding is suitably joined to a part of the separately molded first already-formed member.

At a joint between the first already-formed member and the injection molded portion, the shape of the joining surface of the first already-formed member may be the same as the shape of the joining surface of the injection molded portion.

With this structure, an effect is obtained, in which the joining surface of the first already-formed member and the joining surface of the injection molded portion are mutually joined to each other in an equal shape, and at the joined portions, a joint is formed in which the edge of the first already-formed member and the edge of the injection molded portion are smoothly connected to each other without having any steps, so a molded product with good appearance can be provided.

A boundary portion of the first already-formed member and the injection molded portion may form a smooth surface continuing from the first already-formed member side to the injection molded portion side.

With this structure, an effect is obtained in which a molded product with excellent appearance can be provided because the boundary portion of the first already-formed member and the injection molded portion is continuously joined to each other without any convex/concave portions.

A joint strength of the entire joining surface of the first already-formed member and the injection molded portion of the molded product may be uniform.

With this structure, an effect is obtained in which a high-quality molded product with a long-term excellent appearance without cracks is provided.

The first already-formed member may have a portion which is protruded so as to be thin at least at part of a cross-sectional shape.

With this structure, an effect is obtained in which a molded product can be provided, which is provided with a protrusion portion with excellent quality in which the joining surface of the first already-formed member and the injection molded portion are reliably joined to each other.

BRIEF DESCRIPTION OF THE DRAWINGS

Exemplary embodiments are described below in connection with the drawings, in which like numerals represent like parts, and in which.

DETAILED DESCRIPTION OF EMBODIMENTS

Figure 1:
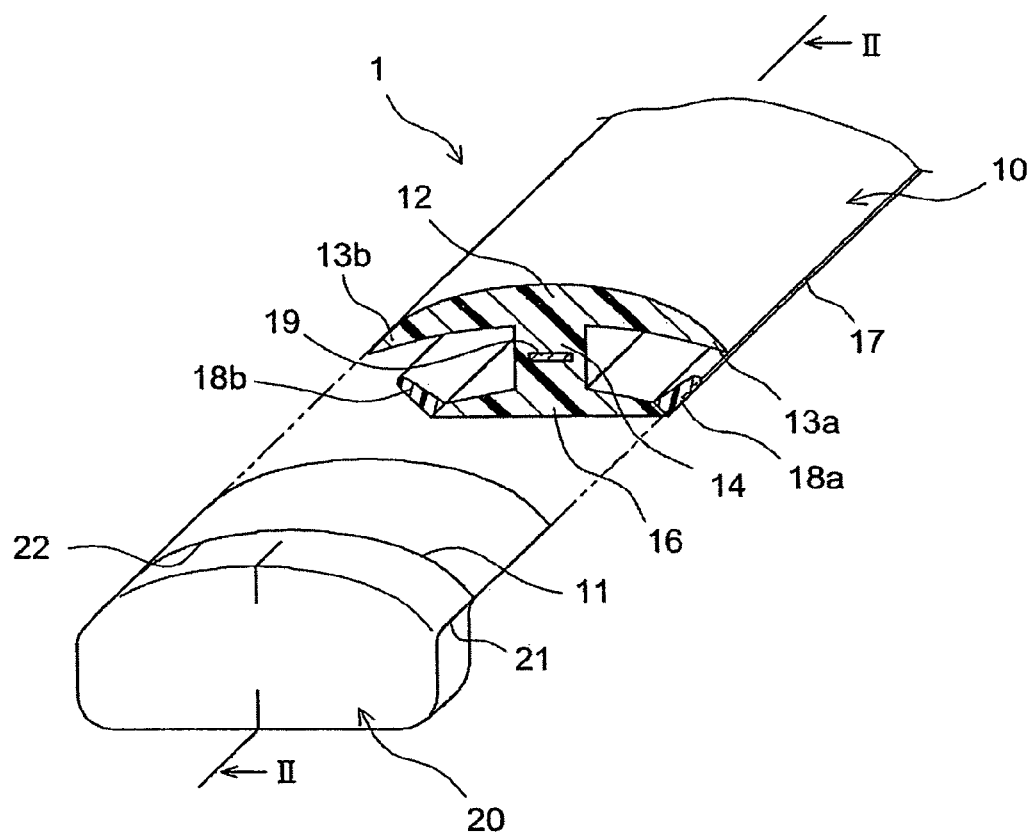
FIG. 1 is a perspective view of a longitudinal direction end portion of a roof molding of an embodiment of this invention.

The following explains exemplary embodiments of this invention. Furthermore, any items needed to implement this invention other than the items particularly referred to in this specification can be understood as items well known to those skilled in the art based on conventional technology. This invention can be implemented based on items disclosed in this specification and drawings and on technical common sense in the related field.

A "molded product provided with an injection molded portion" manufactured by a manufacturing method disclosed herein comprises a member that is formed by, e.g., extrusion molding, etc. in advance, and an injection molded portion connected to the end surface (joining surface) of the member that has been formed in advanced (hereafter referred to as "already-formed member"). Various molded members are included that have various shapes depending on the location in which the molded product is installed, and/or the purpose for which the molded product is installed. As this type of molded product, for example, vehicle exterior parts such as roof moldings, weather strips, glass run channels, and door opening trims, or architectural or structural parts, can be listed.

The following explains various embodiments of this invention with reference to drawings, but the invention is not limited to the embodiments shown in the drawings.

Figure 2:
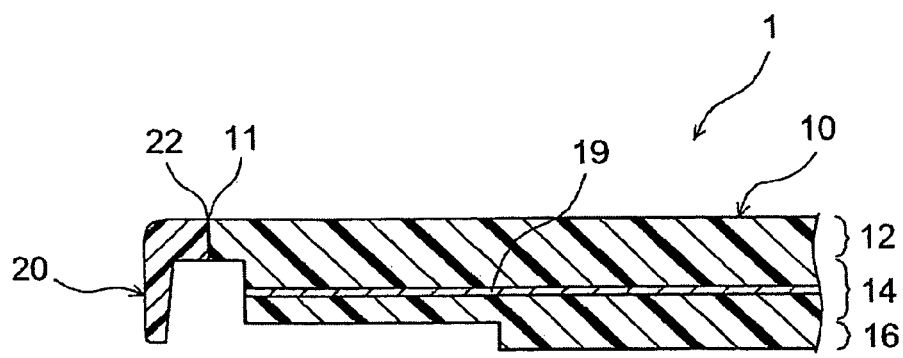
FIG. 2 is a II-II longitudinal sectional view of FIG. 1.

As a molded product provided with an injection molded portion, a roof molding 1 that mounts to a common vehicle (automobile) roof is used for explanation. FIG. 1 is a perspective view of a longitudinal direction terminal portion of a roof molding 1 according to an embodiment of this invention. Furthermore, FIG. 2 is a II-II longitudinal sectional view of FIG. 1.

As shown in FIG. 1, the roof molding 1 of an embodiment of this invention is constituted by a roof molding main body portion 10 (first molded member according to this embodiment) formed to be elongate by extrusion molding and an end cap 20 (injection molded portion according to this embodiment) formed at a longitudinal direction end portion of the roof molding main body portion 10. That is, as shown in FIG. 2, the roof molding 1 is a molded product in which an exposed joining surface 11 of the roof molding main body portion 10 and a joining surface 22 of the molded end cap 20 are joined.

Figure 3:
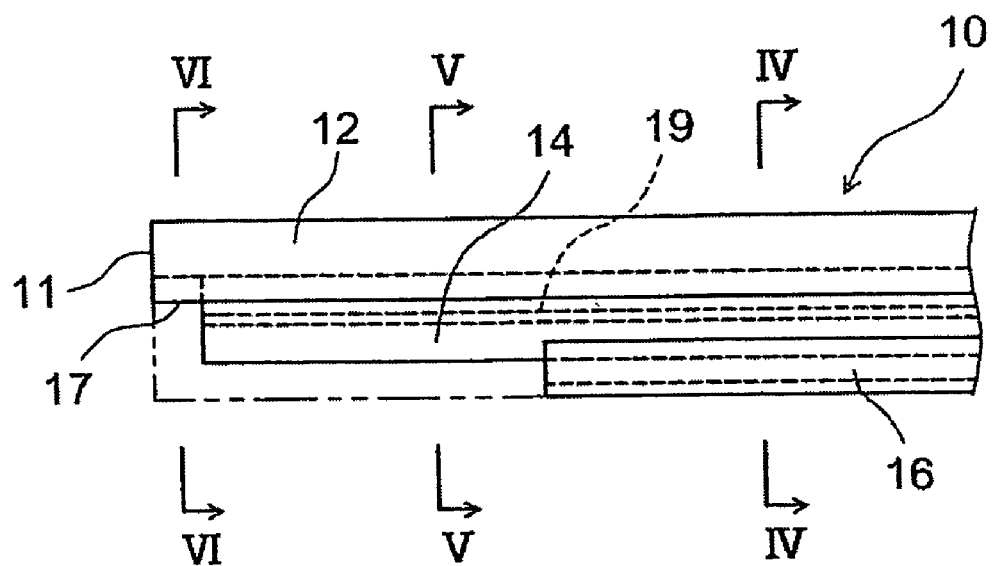
FIG. 3 is a side view of a roof molding main body portion of an embodiment of this invention.
Figure 4:
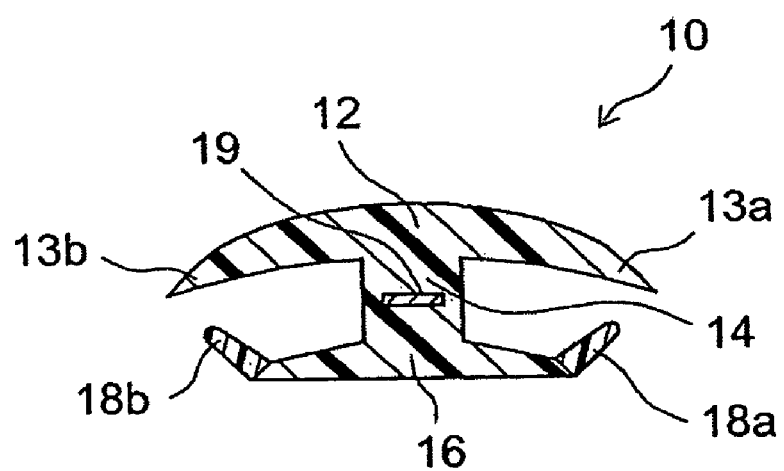
FIG. 4 is a IV-IV cross-sectional view of FIG. 3.
Figure 5:
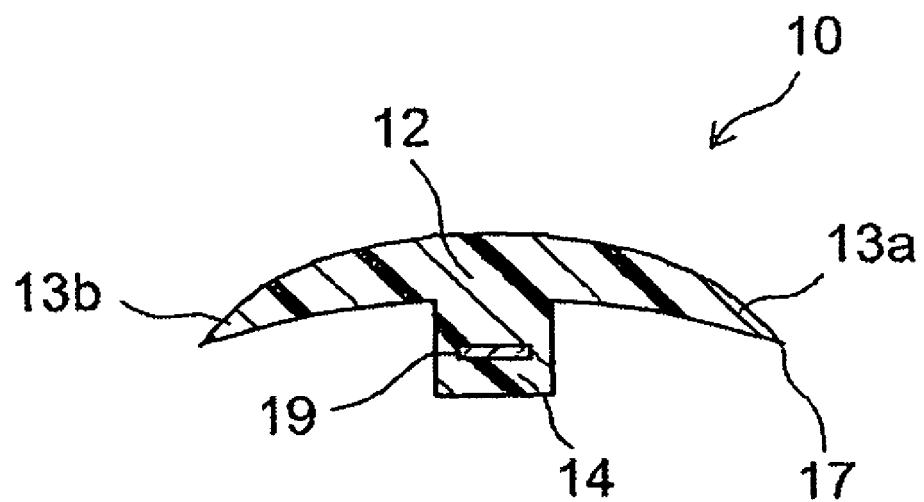
FIG. 5 is a V-V cross-sectional view of FIG. 3.
Figure 6:
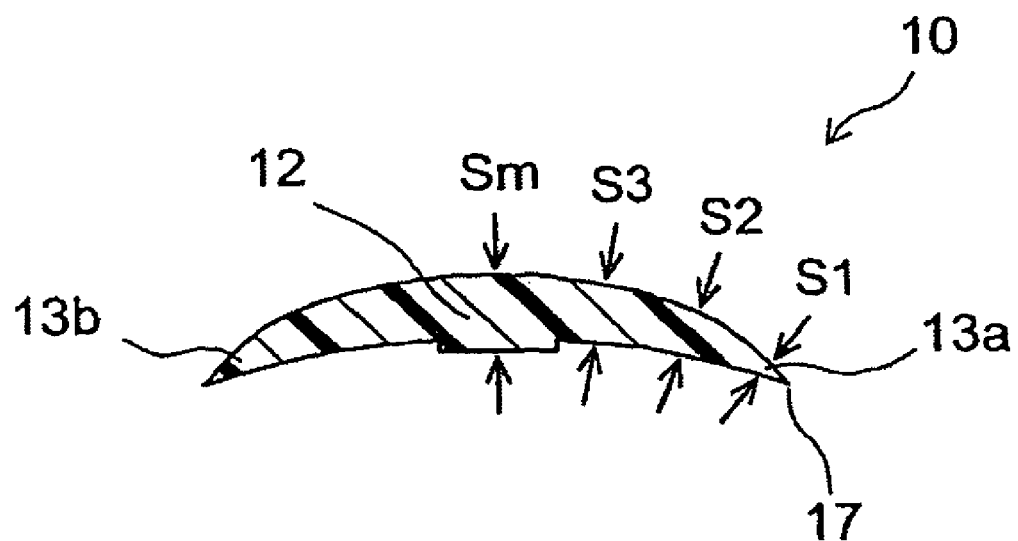
FIG. 6 is a VI-VI cross-sectional view of FIG. 3.

FIG. 3 shows a perspective view of the roof molding main body portion 10. FIGS. 4-6 show cross-sectional views of respective different portions of the roof molding main body portion 10 of FIG. 3.

As shown in FIGS. 3 and 4, generally, a cross-sectional shape of the roof molding main body portion 10 is formed of a head portion 12 (wing portion), a leg portion 14, and a projection portion 16.

The head 12 is formed to be wider than a width of a groove arranged in an undepicted vehicle roof on which the roof molding 1 is mounted. Furthermore, as shown in FIG. 6, the head portion 12 is formed to have a greatest thickness Sm at a width direction center. Additionally, approaching the edges 17 of the head portion 12 in a width direction, it becomes thinner such as S3>S2>S1. Edges 13a, 13b of the head portion 12 in the width direction are formed to be the thinnest portions of the head portion 12.

Meanwhile, as shown in FIG. 4, a leg portion 14 is formed so as to protrude substantially perpendicular to the width direction of the head portion 12 from the vicinity of the center of the head portion 12. The projection portion 16 is formed, which projects in both width directions from the vicinity of the lower end of the leg portion 14. At both tip ends of the projection portion 16 in the width directions, elastic lips 18a, 18b are respectively molded.

Furthermore, depending on the shape of the mounting portion of the vehicle on which the roof molding 1 is mounted, as described later, a part of the leg portion and the projection portion of the roof molding main body portion 10 may be notched along a longitudinal direction in advance so as to mold it in a desired shape. Furthermore, on an exposed surface 11 at a longitudinal end of the roof molding main body portion 10 which has been cut, by molding and joining an end cap 20 by injection molding, a roof molding 1 is molded, which is provided with an end portion so as not to diminish the appearance of the vehicle.

The end cap 20, which is an injection molded portion of this embodiment, is a member formed at the longitudinal direction end portion of the molding main body portion 10. As shown in a longitudinal sectional view of the roof molding of FIG. 2, the longitudinal section of the end cap 20 is molded in a substantially L shape, and a corner portion of the outer circumference is a member with a moderate curve line and is joined smoothly with the exposed surface 11 of the head portion 12 of the roof molding main body portion 10. Furthermore, the shape of the joining surface (exposed surface) 11 of the roof molding main body portion 10 is the same as the shape of the joining surface 22 of the end cap 20. As shown in FIG. 1, a roof molding main body portion edge 17 is continuously and smoothly joined with an end cap edge 21. Furthermore, the boundary portion between the roof molding main body portion edge 17 and the end cap edge 21 forms a smooth surface continuing to the end cap 20 side from the roof molding main body portion 10.

Figure 7:
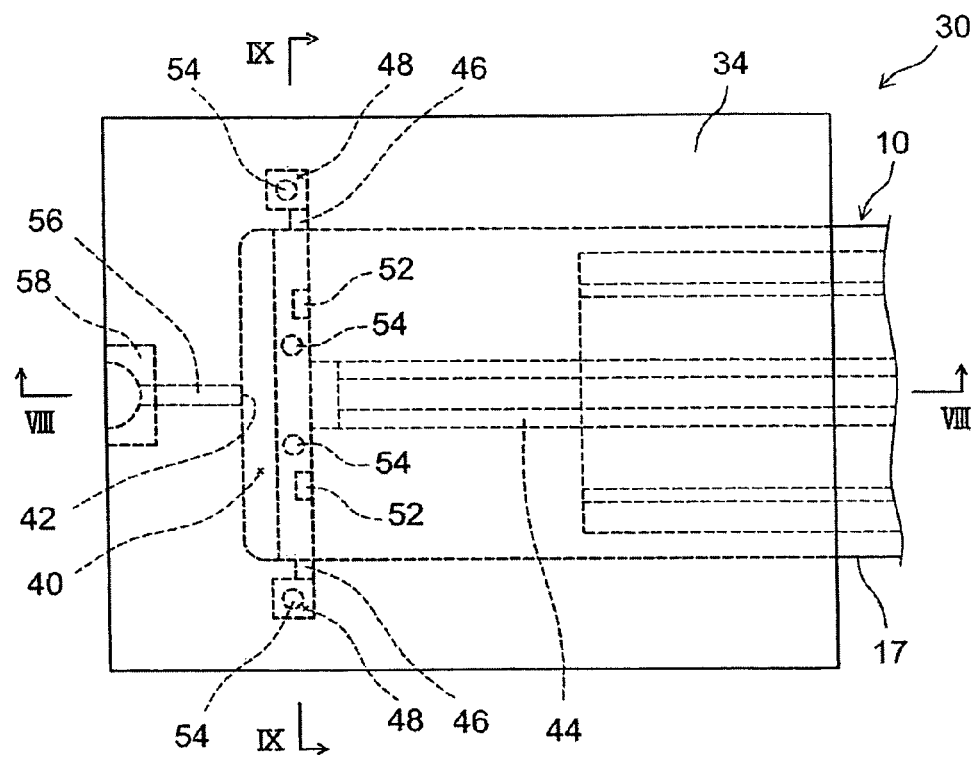
FIG. 7 is a plan view of an injection molding mold according to an embodiment of this invention.
Figure 8:
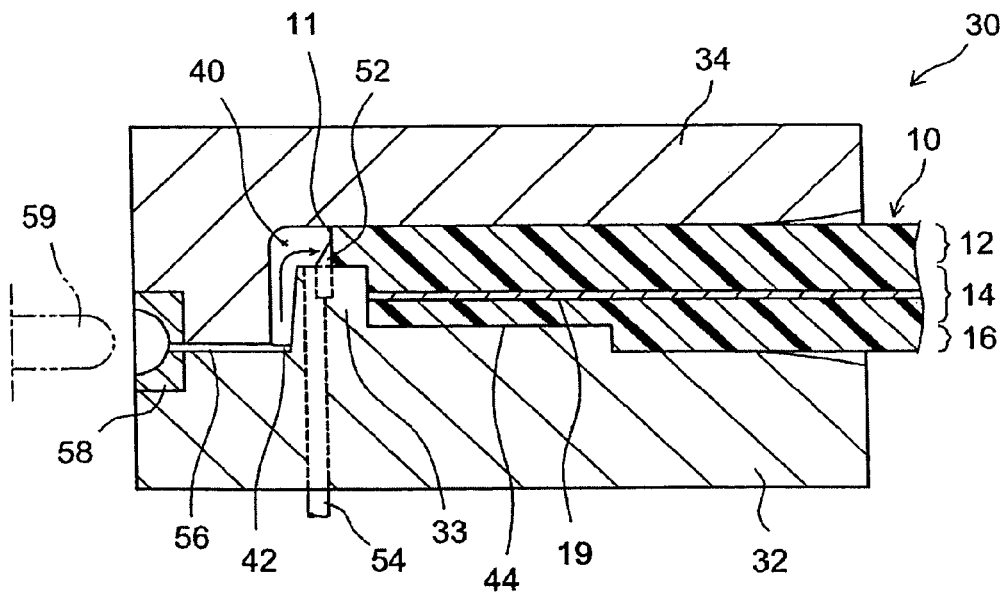
FIG. 8 is a VIII-VIII cross-sectional view of FIG. 7.
Figure 9:
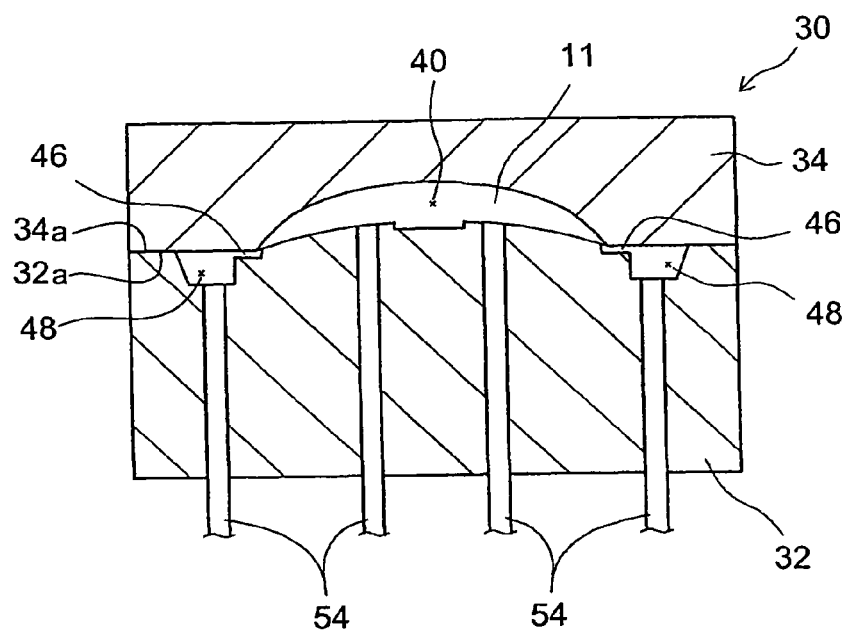
FIG. 9 is a IX-IX cross-sectional view of FIG. 7.

FIG. 7 is a plan view of an injection molding mold, which molds the roof molding 1 of an embodiment of this invention. Furthermore, FIGS. 8 and 9 are VIII-VIII and IX-IX cross-sectional views of FIG. 7, respectively. The following explains a method of manufacturing the above-mentioned roof molding 1 with reference to FIGS. 7-9 as an example of an exemplary manufacturing method of this invention. However, this invention is not limited to embodiments shown in the drawings.

Additionally, a method of manufacturing a molded product provided with an injection molded portion of this invention includes (1) a step of preparing an injection molding mold provided with a spill cavity and placing an already-formed member (first formed member) at a predetermined position in the injection molding mold, (2) a step of closing the mold, injecting liquid molding material, which has been heated and melted, into the molding cavity from an injection gate and filling the molding cavity, (3) a step of maintaining the molding material for a predetermined period of time while it is pressed into contact with an exposed surface of the first molded member, and (4) a step of separating and removing molding material, which spills into the spill cavity and solidifies, from the molded product. As long as these are provided, various other steps may be included in the same manner as in a general injection molding method. Typically, a step of heating and/or a cooling the injection molding mold, a step of opening the mold and removing the product, a step of supplying molding material from an injection device to the mold, etc. are included.

Furthermore, a device used for implementing such a manufacturing method can use an injection nozzle 59 (see FIG. 8) as a device that supplies a molding material of an injection molded portion and a general injection molder provided with an injection molding mold 30, which will be described later. Therefore, a general injection molder provided with a hydraulic type clamping device or a toggle type clamping device, etc, and a screw type injection device or a plunger type injection device, etc. can be used.

First, an injection molding mold is explained, which is suitable for implementing a method of manufacturing a molded product of this invention.

An injection molding mold 30 of this invention is provided with a pair of molds 32, 34 which can be opened and closed, and a locating ring 58 into which an injection nozzle 59 of an injection molding device is press touched. One pair of molds 32, 34 is constituted by a fixed lower mold 32 and a movable upper mold 34, which forms a predetermined molding cavity 40 inside by closing the mold. As shown in FIG. 9, the lower mold 32 has a parting surface 32a, and the upper mold 34 has a parting surface 34a. The parting surfaces 32a and 34a contact each other at a parting plane (also called a dividing plane) when the mold is closed. As shown in FIGS. 7-9, at the parting plane, when the mold is closed, a sprue 56, an injection gate 42, the molding cavity 40, spill cavities 48, and narrow flow paths 46 are respectively formed. Furthermore, a setting portion 44 is arranged, which places the roof molding main body portion 10 so as to be adjacent to the molding cavity 40. Furthermore, when the roof molding main body portion 10 is placed, stoppers 52 (positioning protrusions) are arranged in the lower mold 32, which place the molding main body portion 10 in an accurate position.

Additionally, "upper mold" and "lower mold" used in this specification refer to a pair of mold component members, which constitute an injection molding mold which can form a desired cavity inside and are not limited to a particular shape. In general, an item including a mold half on a fixed side is called a lower mold, and an item including a mold half on a movable side is called an upper mold, but they are not limited to these.

In the injection molding mold 30 of this embodiment, a sprue 56, which is a passage to inject a liquid polymer molding material that has been heated and melted into the molding cavity 40, and an injection gate 42 are provided. The injection gate 42 is arranged on the lower mold 32 side of the molding cavity 40 at a position separated from the spill cavities 48 (see FIGS. 7 and 8). Thus, an injection gate mark on the end cap 20 that is formed by the heated and melted liquid molding material being injected is in a location where it cannot be seen.

Furthermore, in the injection molding mold 30, when the mold 30 is closed, the molding cavity 40 is formed in the upper mold 34, so the end cap 20 (injection molded portion) is formed in a predetermined shape. The end cap 20 is formed of a molding material that fills the molding cavity 40 and solidifies.

In the injection molding mold 30, the spill cavities 48 are arranged in a direction along a boundary surface at which the exposed surface 11 of the roof molding main body portion 10 and the end cap 20 are joined, and protrude in a direction away from the molding cavity 40. The spill cavities 48 are in communication with the molding cavity 40. Furthermore, the spill cavities 48 are arranged so as to be in communication with portions of the molding cavity 40 corresponding to the thin portions of the head portion edges 13*a*, 13*b* of the roof molding main body portion 10 molded by the molding cavity 40.

Furthermore, it is preferable that the spill cavities 48 are arranged so as to have a tapered shape of which the width is wide on the side in which the injection molding mold 30 is opened. Thus, the molding material pushed into the spill cavities 48 and solidified can be easily removed from the injection molding mold 30.

The spill cavities 48 are arranged via the narrow flow paths 46 that are in communication with the molding cavity 40. Preferably the narrow flow paths 46 are formed in a concave groove shape only at the division surface of the lower mold 32 and have a volume relatively small compared to that of the molding cavity 40 and the spill cavities 48. Furthermore, a cross-sectional area of the narrow flow paths 46 in a direction perpendicular to a flow direction of the molding material injected into the molding cavity 40 from the injection gate 42 is formed so as to be relatively small compared to the cross-sectional area perpendicular to the flow direction in the spill cavities 48.

Thus, when the molding material flows into the narrow flow paths 46 with the above-mentioned structure, shear heat is generated and the molding material is heated. As a result, in the molding material which has been heated by shear heat, increase of viscosity is suppressed and the molding material can be pushed out to the spill cavities 48 smoothly. Furthermore, molding material solidified in the spill cavities 48 can be easily separated from the molded product at the portions corresponding to the narrow flow paths 46 of which the cross-sectional area is small.

Furthermore, it is preferable that the spill cavities 48 and the narrow flow paths 46 are formed in a mold on a side opposite to a mold in which the molding cavity 40 is formed. In this embodiment, the spill cavities 48 and the narrow flow paths 46 are formed in the lower mold 32. Thus, when the molding material solidified in the spill cavities 48 is separated and removed from the molded product, the molding material which has flowed and solidified in the narrow flow paths 46 is formed at a portion (rear surface side of the end cap 20) in which it does not overlap an outer surface of the end cap 20 molded by the molding cavity 40. Therefore, a cut mark is not generated, which can be seen from outside even after the molding material is cut and separated.

Here, as the first molded member which is joined to the injection molded portion, for example, without limiting the invention, an already-made extrusion molded member formed of polymer material can be used. Furthermore, as such an extrusion molded member, as long as the cross sectional shape is uniform, it is acceptable. An extrusion molded member manufactured by various known extrusion molding methods can be used. Therefore, in addition to an item in which the entire first molded member is molded by one molding material, an extrusion molded item using different molding materials in respective parts is also acceptable since the number of molding materials is not limited.

As a polymer material of a first molded member, for example, an elastic polymer such as rubber, an thermoplastic elastomer (TPE) or a thermoplastic synthetic resin (for example, PVC), etc. can be listed. In particular, an extrusion molded member of solid rubber mainly formed of EPDM, an olefin system thermoplastic elastomer (TPO), a styrene system thermoplastic elastomer (TPS), or an olefin system synthetic resin, etc. is preferably used.

Furthermore, as shown in FIGS. 1-5, in order to hold strength, allow extension within a predetermined range, and suppress extension beyond that range, substantially in the center of the leg portion in the width direction, a flat shaped core material 19 (typically a thin strip member formed of steel or stainless steel) is embedded along a longitudinal direction. The core material 19 can help reduce undesired elongation or shrinkage of the product.

Meanwhile, as a suitable molding material of an injection molded portion, a polymer material of a first molded member to be joined and a polymer material which can be thermally welded can be listed. For example, the same molding material (elastic polymer molding material) as the above-mentioned first molded member can be used. Alternatively, if thermal welding is possible (having compatibility), a different polymer molding material can also be used.

Some polymer molding materials that can be thermally welded are polymer molding materials that are mainly formed of rubber, thermoplastic elastomer (TPE) or thermoplastic synthetic resin, etc. In particular, from the perspective that a crystalline polymer material can easily fill a small thin portion, a crystalline polymer material is preferable, in which regularity of a molecular structure is high and volume can be easily closed.

As suitable examples of a crystalline polymer, versatile resins such as polyethylene (PE), polypropylene (PP), etc., and engineering resins such as polyamide (PA), polyacetal (POM), polybutylene terephthalate (PBT), polymethylpentene (TPX), polyphenylene sulfide (PPS), polyether etherketone (PEEK), polytetra phloroethylene (PTFE), etc. can be listed. In particular, PP, POM, PA, PBT, PPS, PEEK, etc. are preferable, in which resin viscosity is kept low in a melted state and which can obtain suitable fluidity.

Furthermore, considering the environment, resin is preferable, which does not include halogen such as chlorine. From a perspective of recycling or the like, an olefin system thermoplastic elastomer (TPO) is preferable. For hard segments, olefin system polyethylene (PE), polypropylene (PP), poly-1-pentene, etc, can be listed. Furthermore, for soft segments, natural rubber (NR), ethylene propylene rubber (EPM), ethylene propylene diene rubber (EPDM), styrene butadiene rubber (SBR), butadiene rubber (BR), butyl rubber (IIR), nitrile butadiene rubber (NBR), chloroprene rubber (CR), etc. can be used. More than two types of polymer can be included as hard segments. This also applies to soft segments.

The following explains a preferred embodiment of a method of manufacturing a molded product of this invention with reference to drawings. However, the invention is not limited to this specific example.

First, the roof molding main body portion 10 is cut to a shape shown in FIGS. 3-6, and the exposed surface 11 that joins to the end cap 20 is formed. The entire projection portion 16, including the elastic lips 18*a*, 18*b*, is removed at one end portion of the roof molding main body portion 10 in a longitudinal direction as shown in FIG. 5. Additionally, at the tip-most end portion in the longitudinal direction, the entire leg portion 14 and below is removed, so that as shown in FIG. 6, only the head portion 12 remains. Therefore, the exposed surface 11 of the roof molding main body portion 10 has the cross section of the head portion 12. As described above, with respect to the cross section of the head portion 12, the thickness Sm at the width direction center is the greatest thickness of the head portion 12. Approaching the tip end of the head portion 12 in the width direction, it gradually becomes thinner in order of S3>S2>S1. Thus, the edges 13*a*, 13*b* of the head portion 12 in the width direction are thinnest and have protruded shapes.

Additionally, although undepicted, at the other end portion in the longitudinal direction as well, the entire projection portion 16 is removed, and the leg portion 14 is removed at the tip-most end portion.

Furthermore, the injection molding mold 30 is opened, the exposed surfaces 11 of the roof molding main body portion 10 that has been thus notched are placed so as to be exposed to the end surface sides of the molding cavity 40, so that the exposed surfaces 11 of the roof molding main body portion 10, that is, the exposed surfaces 11 of the head portion 12, will be integrally joined to the joining surface 22 of the end caps 20. At this time, position shifting can be suppressed if the cross-sectional surface of the roof molding main body portion 10 is pressed against convex portions 33 arranged in the lower mold 32 (see FIG. 8).

Additionally, by contacting the exposed surfaces 11 of the roof molding main body portion 10 against the stoppers 52 that are arranged so as to contact the notched roof molding main body portion 10, the exposed surfaces 11 of the roof molding main body portion 10 can be accurately positioned and placed in a predetermined position with respect to the molding cavity 40 and the spill cavities 48 of the molding mold 30. In the following step, the exposed surfaces 11 of the roof molding main body portion 10 and the joining surfaces 22 of the end caps 20 can be reliably joined at a correct position (see FIGS. 7 and 8).

Next, after the roof molding main body portion 10 is placed on the setting portion 44 of the lower mold 32, the upper mold 34 on the movable side is closed, and a liquid molding material which has been heated and melted is injected from the injection gate 42 into the molding cavity 40, filling the molding cavity 40.

Figure 10:
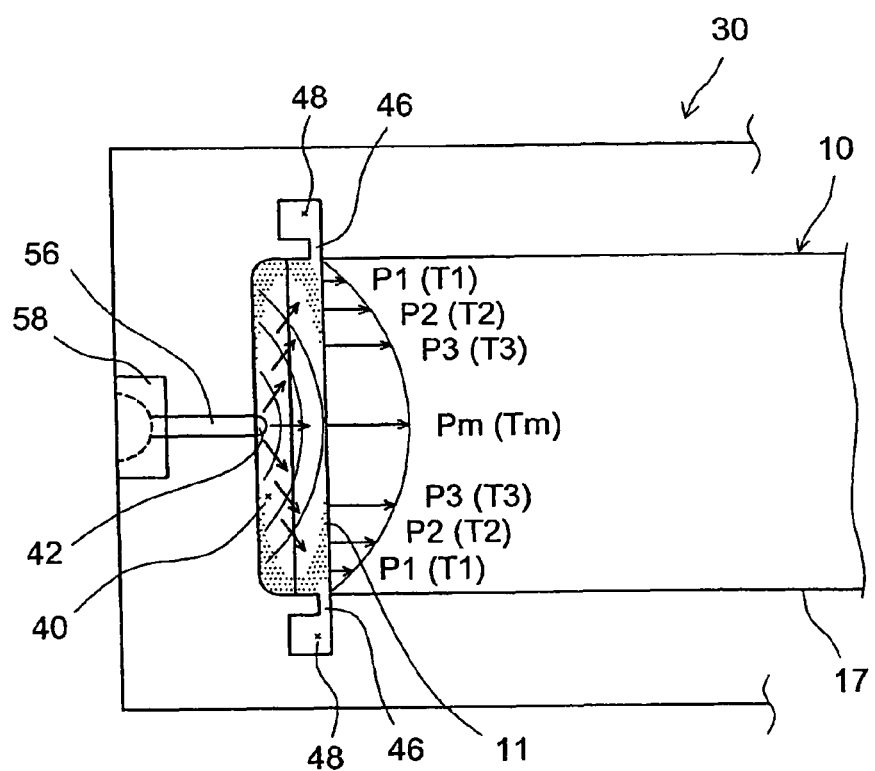
FIG. 10 schematically shows flow direction of a molding material, temperatures of the molding material, and pressures acting on a joining surface before spilling to a spill cavity immediately after the initial molding material is injected into a molding cavity from an injection gate.

FIG. 10 schematically shows the flow direction, temperature (Tm, T3, T2, T1) at the exposed surfaces 11, and pressure (Pm, P3, P2, P1) acting on the exposed surfaces 11, of a molding material (hereafter referred to as "initial molding material") immediately after a thermoplastic polymer material which has been heated and melted is injected into the molding cavity 40 from the injection gate 42. Furthermore, vectors within the molding cavity 40 show the flow direction of the initial molding material, and vectors from the exposed surface 11 of the roof molding main body portion 10 show the magnitude of the pressure at which the molding material acts on the exposed surface. Additionally, the shaded portions show locations at which the initial molding material having lowered temperature and increased viscosity stays at that time.

First, a liquid thermoplastic polymer molding material at temperature Tm which has been heated to a melting temperature or above is injected into the molding cavity 40 from the injection gate 42 at a predetermined injection pressure through the sprue 56. The initial molding material injected into the molding cavity 40 flows and substantially radially spreads within the molding cavity 40 about the injection gate 42. The initial molding material which is substantially radially spread reaches the exposed surface 11 of the center portion, in the width direction, of the roof molding main body portion 10 within from a fraction of a second to several seconds (or less) after injection begins. Then, it gradually moves into the cavity portions which form the width direction edges 13a, 13b (see FIG. 6) of the exposed surface 11.

Heat is transferred from the initial molding material to the injection molding mold 30 during flow, so when it reaches the exposed surface 11 of the roof molding main body portion 10, the temperature of the polymer molding material is lower than its temperature at the position of the injection gate 42. Furthermore, viscosity of the molding material in which the temperature has decreased is high, and fluidity also decreases. Thus, the temperature T1 of the molding material in the cavity portions at which the head portion edges 13a, 13b furthest from the injection gate 42 are formed is lower than the temperatures Tm, T3, T2 at other portions.

Furthermore, in the cavity portions in which the head portion edges 13a, 13b are formed, when the molding material reaches the exposed surface 11 of the roof molding main body portion 10, pressure decreases due to a pressure loss resulting from viscosity increase based on the temperature decrease. Compared to the respective pressures Pm, P3, and P2 at other portions, the pressure P1 becomes the smallest.

As a result, the S1 portions corresponding to the head portion edges 13a, 13b shown in FIGS. 5 and 6 are thinner than other portions (Sm, S3, S2). Thus, in the thin portions, the heat needed for a polymer molding material to be joined is not generated, and the pressure is also low. Therefore, it is difficult to spread the heat to the thin tip ends.

Figure 11:
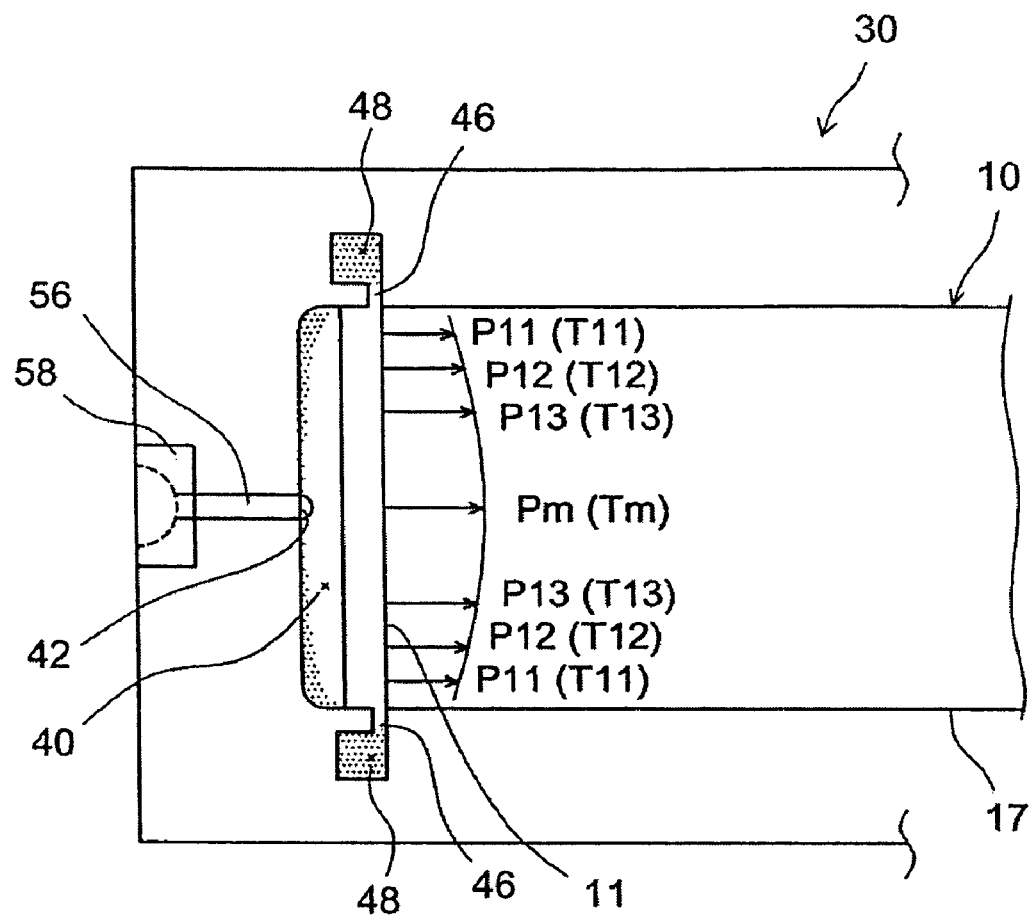
FIG. 11 schematically shows temperatures of the molding material, and pressures acting on the joining surface when the initial molding material is spilled to a spill cavity after being injected into the molding cavity from the injection gate.

FIG. 11 schematically shows, with arrows, pressures (Pm, P13, P12, P11) acting on the exposed surface 11 from molding material (hereafter referred to as "subsequent molding material") when more polymer molding material is injected into the molding cavity 40 from the injection gate 42, and initial molding material is pushed into the spill cavities 48. Temperatures (Tm, T13, T12, T11) at the exposed surface 11 are also shown by the arrows. Furthermore, the lengths of the arrows from the exposed surface 11 of the roof molding main body portion 10 show vectors, and the pressures at which the subsequent molding material acts on the exposed surface 11, and the temperatures, are shown by the length of the arrows. Additionally, the shaded portions show locations at which the initial molding material, of which the temperature has decreased, stays.

When the initial molding material which reaches the cavity portions forming the head portion edges 13a, 13b is in a fluid state prior to hardening, it is pushed into the spill cavities 48 by injection pressure of the subsequent molding material, of which the temperature is high and viscosity is low. At this time, in the molding material that is spilled by going through the narrow flow paths 46 whose volume is smaller than that of the molding cavity 40 and the spill cavities 48, shear heat is generated. Thus, the temperature of the molding material going through the narrow flow paths 46 increases. Accordingly, viscosity of the initial molding material decreases and it is smoothly output to the spill cavities 48.

Furthermore, the initial molding material in the vicinity of the exposed surface 11 of the roof molding main body portion 10 is pushed into the spill cavities 48. Thus, at the exposed surface 11 of the roof molding main body portion 10 and the vicinity thereof, the initial molding material is replaced with the subsequent molding material. Therefore, the temperatures (T11, T12, T13) at the respective portions become high because of the high-temperature subsequent molding material which replaced the initial molding material. Compared to the case of FIG. 10 (that is, before the initial molding material is output to the spill cavities 48), temperatures of the molding material increase such that T11>T1, T12>T2, and T13>T3. Furthermore, in the same manner as the temperatures, pressures applied to the exposed surface 11 at the respective portions increase such that P11>P1, P12>P2, P13>P3 compared to the state of FIG. 10.

Thus, as shown in FIG. 11, according to a manufacturing method of this invention, the initial molding material is pushed into the spill cavities 48, so the subsequent molding material holding heat and pressure sufficient to join the exposed surface 11 can reach the exposed surface 11 of the roof molding main body portion 10. Thus, suitable joining is realized between the exposed surface 11 of the roof molding main body portion 10 and the joining surface 22 of the end cap 20.

Furthermore, the initial molding material may attach to dust, oil, etc. of the molding cavity 40. If this is the case, when an injection molded portion is formed of an initial molding material with a foreign object, joint strength of the joining surface decreases. However, according to a manufacturing method of this invention, the initial molding material is replaced with the subsequent molding material without dust, oil, etc., so a high joint strength can be realized.

When the molding material of the roof molding main body portion 10 and the molding material of the end cap 20 are not compatible, or when compatibility is poor, a thermally activated adhesive layer can be applied in advance to the exposed surface 11 to be joined. Thus, when a liquid molding material which has been heated and melted reaches the exposed surface, the adhesive applied on the exposed surface is activated by heat of the molding material, and strong adhesion can be achieved.

Thus, when a molding material fills the molding cavity 40, while the molding material is pressed against the exposed surface 11 of the roof molding main body portion 10, it is maintained for a predetermined period of time (typically the mold 30 is cooled while a pressed holding state is maintained), and the polymer molding material within the molding cavity 40 is solidified.

After solidification, the upper mold 34 is moved by an undepicted mold clamping mechanism so as to open the mold, and it is separated from the lower mold 32 along with the end cap 20 formed within the molding cavity 40 and the molding material which has flowed into the spill cavities 48 and the narrow flow paths 46. After the molds 32 and 34 are separated, the molded portions can be easily ejected by pushing the tip ends of ejection pins 54 (ejectors), which are arranged so as to pass through the main body of the lower mold 32, against the rear surface of the end caps 20. Additionally, the ejection pins 54 can be arranged in the molding cavity 40 and the spill cavities 48; thus, the molding material solidified in the respective cavities can be simultaneously removed from the lower mold 32.

After the molded portions are removed from the mold, the molding material solidified in the portions corresponding to the narrow flow paths 46 and the spill cavities 48 is separated and removed from the end cap 20 by cutting or the like. The narrow flow paths 46 are arranged in a mold (lower mold 32) on a side opposite to a mold (upper mold 34) in which the molding cavity 40 is molded. Thus, the molding material solidified in the portions corresponding to the narrow flow paths 46 is not connected to the outer surface of the end cap 20. Thus, if the molding material of the portions corresponding to the narrow flow paths 46 is cut at the boundary portion of the end cap 20, the cut mark can not be seen from the outside, and does not remain in a position where it can be seen, and the roof molding 1 with excellent appearance is manufactured.

With respect to the roof molding 1 manufactured by the manufacturing method of this invention, the subsequent molding material having sufficient heat and pressure on the exposed surface 11 of the roof molding main body portion 10 is injected. The subsequent molding material is spread particularly to the head portion edges 13a, 13b which are the thinnest projected portions, so a solid joint without cracks is formed. Thus, the roof molding 1 with high quality can be obtained.

Additionally, as shown in FIGS. 1 and 2, the shape of the joining surface 11 of the roof molding main body portion 10 is the same as the shape of the joining surface 22 of the end cap 20. The boundary portion forms a smooth surface continuing to the end cap 20 side from the roof molding main body portion 10. Furthermore, the roof molding 1 with excellent appearance is obtained, in which the roof molding main body portion end edge 17 and the end cap end edge 21 are smoothly and continuously joined.

A manufacturing method and device were explained above using the roof molding 1 as an example, but this invention is not limited to this embodiment. Various members, for example, a glass run channel 70, a door opening trim 90, etc., which include a molded product with an injection molded portion on a part thereof can be manufactured. Hereafter, as these examples, a method of manufacturing the glass run channel 70 and the door opening trim 90 is explained.

Figure 12:
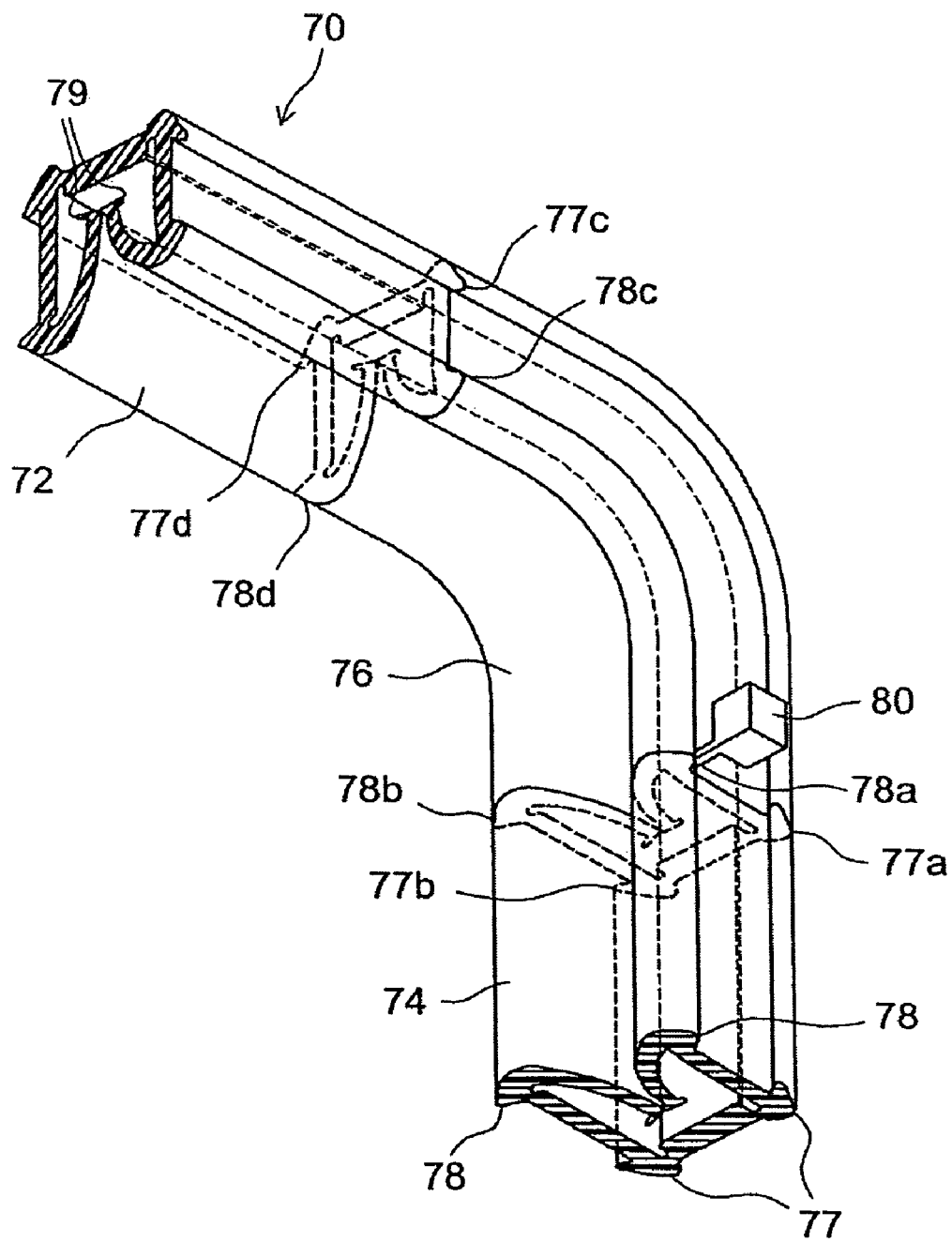
FIG. 12 is a partial perspective view of a glass run channel of an embodiment of this invention.

As another example of a molded product which can be obtained by a manufacturing method of this invention, the glass run channel 70 can be listed. FIG. 12 is a partial perspective view of a glass run channel manufactured according to an embodiment of this invention. The glass run channel 70 (this is also called a glass run, a run channel, a window plate guide member, etc.) is a member that is attached to a window frame arranged on an upper side of the main body of a door panel such as a sliding door, a front door, a rear door, etc. of a vehicle. This is mounted to a glass run channel mounting groove inside of a window frame of a vehicle and is used to guide a window plate as it is raised and lowered.

As shown in FIG. 12, the glass run channel 70 of this embodiment is provided with an injection molded portion 76 provided with a substantially L shape and is a molded product in which an already-made elongate first molded member 72, which is separately molded, and an already-made elongate second molded member 74, which is separately molded, are joined at both ends of the injection molded portion 76 in the longitudinal direction. Furthermore, the glass run channel 70 has a cross-sectional shape having a bottom portion and two side wall portions, one protruding each side, in the width direction, of the bottom portion. The cross-sectional shape is a substantially U shape. Engagement lips 77 are formed on outer sides of both side wall portions on the bottom side, concealing lips 78 are formed on an external side at the free end of both side wall portions, and sealing lips 79 are formed inside the side wall portions.

According to a method of manufacturing the glass run channel 70, first, ends of the first and second molded members 72 and 74, respectively, are placed at predetermined positions within an injection molding mold, separated by a predetermined dimension and crossed in a substantially L shape. When the injection molding mold is closed, the exposed surfaces of the ends of the first and second molded members 72 and 74, respectively, in the longitudinal direction, form part of the molding surface of the molding cavity. Furthermore, molded portions 80, which are portions of the molding material that solidified in the spill cavities, can be arranged at positions corresponding to the thin projecting portions, that is, the engagement lips 77a-77d, and the concealing lips 78a-78d (in FIG. 12, a molded portion 80 that has solidified in a spill cavity is described in only a position corresponding to 78a, but in the same manner, spill cavities and corresponding molded portions can also be arranged in other positions corresponding to 77a-77d and 78a-78d, if needed).

Next, molding material is injected between the respective exposed surfaces of the first and second molded members 72 and 74, and the injection molded portion is molded. At the same time, the first and second molded members 72 and 74, respectively, are joined. The first and second molded members 72 and 74 can be connected, and the glass run channel 70 can be molded. As for other steps, the same steps (for example, preparing an injection molding mold and an injection molding device, etc.) as in the method of manufacturing the roof molding 1 can be used.

Additionally, the first and second molded members 72 and 74, which connect to the injection molded portion 76, are both elongate, and can be members manufactured by conventional extrusion molding, etc. Furthermore, even if the cross-sectional shapes (shapes of the exposed surfaces) of the first and second molded members 72 and 74 are different from each other, the glass run channel 70 can be manufactured by using an injection molding mold provided with a molding cavity shape corresponding to the respective exposed surfaces.

Figure 13:
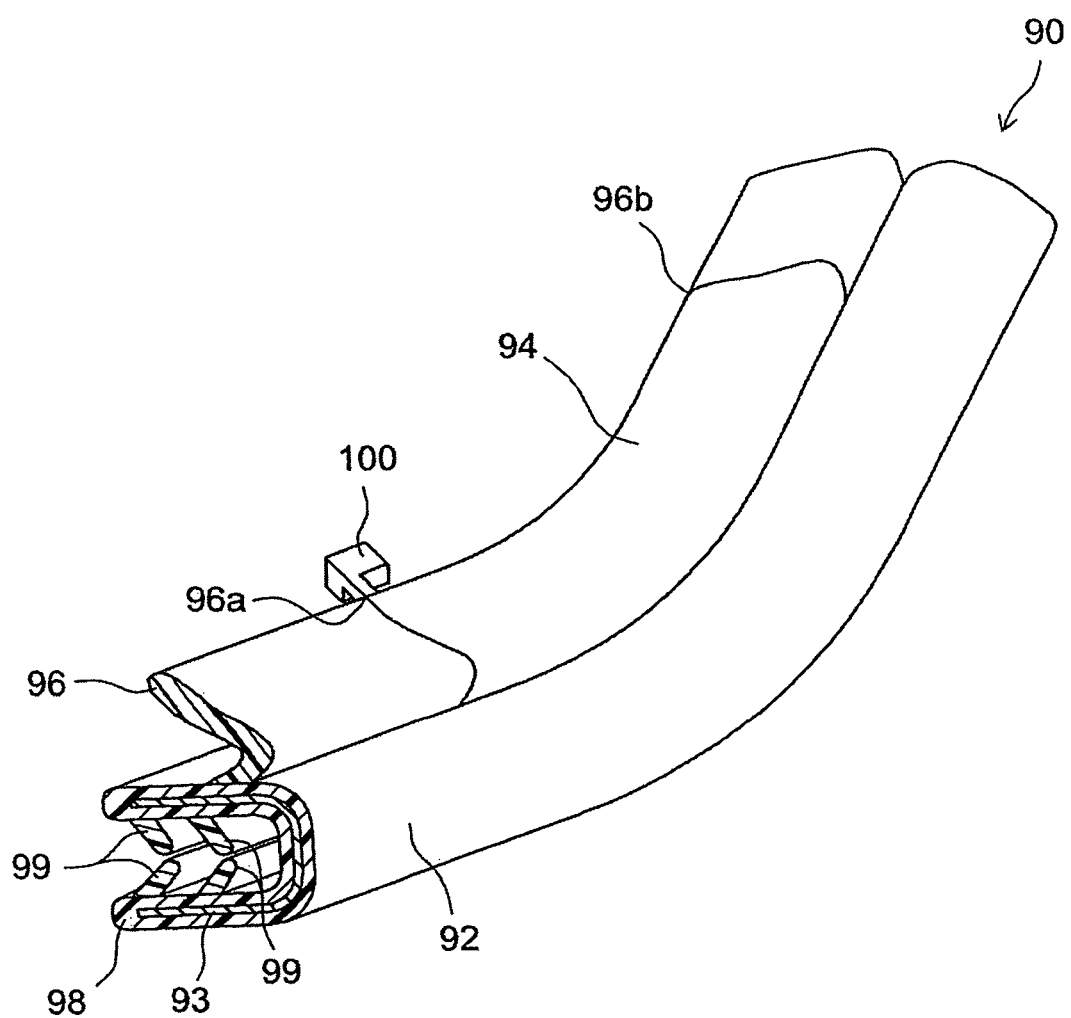
FIG. 13 is a partial perspective view of a door opening trim of an embodiment of this invention.

Furthermore, as another example of a molded product which can be obtained by a manufacturing method of this invention, a door opening trim 90 is listed in which part of an elongate first molded member 92 is notched for a predetermined dimension in the longitudinal direction, and the exposed surfaces formed by notching are connected by an injection molded portion 94. FIG. 13 is a partial perspective view of a door opening trim manufactured according to an embodiment of this invention.

As shown in FIG. 13, the door opening trim 90 (which may also be called a door opening seal or a door opening weather strip) of this embodiment is an elongate member, in which the notched portion is mounted in an injection molding mold in a state in which the notched portion is bent in a substantially L shape after a sealing lip 96 of a material that has been extrusion molded in a linear shape is notched for a predetermined dimension in a longitudinal direction, and the sealing lips 96 of the bent corner portion are connected by the injection molded portion 94. The cross-sectional shape of the door opening trim 90 is formed by a substantially U-shaped trim portion 98, a sealing lip 96 formed to be thin toward the outside from the trim portion 98, and four holding lips 99 protruding from the trim portion 98 to the inside. Furthermore, inside of the trim portion 98, a metal core material 93 is embedded, which holds the shape in the longitudinal direction.

According to a method of manufacturing the door opening trim 90, first, part of the sealing lip 96 in the corner portion of the linear first molded member 92 that has been extrusion molded in an elongate shape along with the core material 93 is notched for a predetermined length along the longitudinal direction, and the trim portion 98 of the corner portion is placed in an injection molding mold in a state in which the trim portion 98 of the corner portion is bent in a circular-arc shape with a predetermined radius of curvature. When the injection molding mold is closed, the exposed surfaces of the notched sealing lip 96 of the first molded member 92 become part of the molding surface of the molding cavity. Additionally, at positions corresponding to thin projecting portions of the exposed surfaces of the molded member, that is, the respective exposed surfaces 96a, 96b of the sealing lip 96, molded portions 100 are arranged. The molded portions 100 are portions of the molding material that solidified in the spill cavities. (In FIG. 13, a molded portion 100 that has solidified in a spill cavity is described in only a position corresponding to 96a, but in the same manner, spill cavities and corresponding molded portions can also be arranged in other positions, such a position corresponding to 96b, if needed).

Next, the injection molded portion 94 of the sealing lip 96 is molded by injection molding. At the same time, the exposed surfaces 96a, 96b are joined by the injection molded portion 94, so the door opening trim 90 having a smooth joint portion can be manufactured. Furthermore, as for other steps, the same steps as for the method of manufacturing the roof molding 1 can be used.

Thus, specific examples of this invention were explained in detail with respect to drawings, but these are only examples and do not limit the scope of the claims. The technology disclosed in the scope of the claims includes various modifications and changes to the specific examples shown above.

What is claimed is:

1. A method of manufacturing a molded product that includes (i) a head portion including an outward-facing surface that faces in a first direction, and an inward-facing surface that faces in a second direction opposite the first direction and (ii) a projection portion including an elastic lip that protrudes in the first direction, the method comprising:

placing a first already-formed member, which has a joining surface, in an injection molding mold, the injection molding mold and the joining surface defining a molding cavity when the injection molding mold is closed, the molding cavity having a center point and tapering from the center point to a sharp edge, as viewed in cross section, the molding cavity having a first thickness at the center point, and having a second thickness less than the first thickness at a midpoint between the center point and the sharp edge, the injection molding mold further defining, when closed, a spill cavity that protrudes in a direction that (i) extends from the joining surface of the first already-formed member and (ii) is a direction of separation from the molding cavity, the spill cavity being in communication with the molding cavity at the sharp edge of the molding cavity, the spill cavity being connected to a surface of the molding cavity other than a surface that forms the outward-facing surface of the head portion, all surfaces of the molding cavity that form the outward-facing surface of the head portion being free of connection to any spill cavity;

injecting heated and melted liquid molding material into the molding cavity, at least some of initial molding material which has initially reached the joining surface flowing into the spill cavity due to injection pressure of subsequent molding material injected after injection of the initial molding material, and being replaced with the subsequent molding material, which has a temperature higher than that of the initial molding material and a viscosity lower than that of the initial molding material;

holding the subsequent molding material pressed against the joining surface of the first already-formed member for a predetermined time, causing pressure and/or heat of the subsequent molding material to act on the joining surface of the already-formed member; and allowing the liquid molding material to harden to form an injection molded portion joined to the joining surface of the first already-formed member, the first already-formed member and the injection molded portion together being a joined molded product.

2. The manufacturing method of claim 1, further comprising separating and removing the molding material that flowed into the spill cavity from the joined molded product.

3. The manufacturing method as set forth in claim 1, wherein the spill cavity is connected to the molding cavity through a narrow flow path, and shear heat is generated by the flow of the initial molding material through the narrow flow path.

4. The manufacturing method as set forth in claim 1, wherein as a molding material of the injection molded portion, a polymer molding material which can be thermally welded to the first already-formed member is used, and the joining surface of the first molded member and the injection molded portion are joined by thermal welding.

5. The manufacturing method as set forth in claim 4, wherein the first already-formed member is formed of at least one selected from a group consisting of rubber and a thermoplastic synthetic resin, and as a molding material of the injection molded portion, a thermoplastic synthetic resin is used.

6. The manufacturing method as set forth in claim 1, wherein on the joining surface of the first already-formed member, a thermally activated adhesive layer is applied in advance.

7. The manufacturing method as set forth in claim 1, wherein a second already-formed member different from the first already-formed member is positioned at a predetermined position within the injection molding mold, separated from the first already-formed member, and when the injection molding mold is closed, at least part of the second already-formed member is exposed to the molding cavity as a joining surface, and the exposed joining surface of the second already-formed member is made part of the molding surface of the molding cavity; and the injection molded portion is molded between the respective joining surfaces of the first and second already-formed members, and the first and second already-formed members are connected through the injection molded portion by connecting the first and second already-formed members with the injection molded portion.

8. The manufacturing method as set forth in claim 7; wherein a shape of the joining surface of the first already-formed member is different from a shape of the joining surface of the second already-formed member.

9. The manufacturing method as set forth in claim 7, wherein the first and second already-formed members are both elongate members, and the joining surfaces are formed on longitudinal direction ends of the elongate members.

10. The manufacturing method as set forth in claim 7, wherein the first and second already-formed members are positioned so that the joining surfaces are separate from each other and lie in crossing planes, and a substantially L-shaped injection molded portion is molded, such that the first and second already-formed members are connected in a substantially L shape through the injection molded portion.

11. The manufacturing method as set forth in claim 1, wherein the first already-formed member is elongate, and part of the elongate first already-formed member is notched for a predetermined length along a longitudinal direction, such that part of the first already-formed member is divided in two, and two exposed joining surfaces opposite to each other are formed at a predetermined interval along the longitudinal direction, the injection molded portion is molded between the two joining surfaces, and the joining surfaces of the first already-formed member are connected through the injection molded portion.

12. The manufacturing method as set forth in claim 1, wherein an extrusion molded material formed of a polymer material is used as the first already-formed member.

\* \* \* \* \*